US011447188B2

(12) United States Patent
Schmidt

(10) Patent No.: US 11,447,188 B2
(45) Date of Patent: Sep. 20, 2022

(54) VEHICLE BODY PLATFORM FOR AN AUTOMOBILE AND AUTOMOBILE COMPRISING SUCH A VEHICLE BODY PLATFORM

(71) Applicant: PIËCH DESIGN AG, Zürich (CH)

(72) Inventor: Klaus Schmidt, Paunzhausen (DE)

(73) Assignee: PIËCH DESIGN AG, Zurich (CH)

( * ) Notice: Subject to any disclaimer, the term of this patent is extended or adjusted under 35 U.S.C. 154(b) by 87 days.

(21) Appl. No.: 16/766,252

(22) PCT Filed: Nov. 21, 2018

(86) PCT No.: PCT/EP2018/082125
§ 371 (c)(1),
(2) Date: May 21, 2020

(87) PCT Pub. No.: WO2019/101815
PCT Pub. Date: May 31, 2019

(65) Prior Publication Data
US 2021/0031837 A1 Feb. 4, 2021

(30) Foreign Application Priority Data
Nov. 22, 2017 (CH) .................................... 01414/17

(51) Int. Cl.
*B60J 9/00* (2006.01)
*B62D 25/08* (2006.01)
(Continued)

(52) U.S. Cl.
CPC ....... *B62D 25/085* (2013.01); *B62D 25/2018* (2013.01); *B62D 27/065* (2013.01)

(58) Field of Classification Search
CPC ............. H01L 29/1095; H01L 29/7813; H01L 29/0696; H01L 29/7802; H01L 29/7808;
(Continued)

(56) References Cited

U.S. PATENT DOCUMENTS 5,090,105 A * 2/1992 DeRees ................ B62D 63/025
29/460
10,780,930 B1 * 9/2020 Kentley-Klay ...... B62D 65/022
(Continued)

FOREIGN PATENT DOCUMENTS

CA 1209610 A 8/1986
CN 2926005 Y 7/2007
(Continued)

OTHER PUBLICATIONS

International Search Report and Written Opinion for International Application No. PCT/EP2018/082125 dated Nov. 21, 2018, 7 pages.

*Primary Examiner* — Kiran B Patel
(74) *Attorney, Agent, or Firm* — Perkins Coie LLP

(57) ABSTRACT

The invention is directed to a vehicle body platform (1) for an automobile, comprising a passenger body module (100) having a front structural interface (110) and a rear structural interface (120). The vehicle body platform further comprises a front body module (200) having a rear structural interface (220) 210 and a rear body module (300) comprising a front structural interface (310). The rear structural interface (220) of the front body module (200) and the front structural interface (110) of the passenger body module (100) are corresponding structural interfaces configured to mechanically interconnect the passenger body module (100) with the front body module (200) and the front structural interface (310) of the rear body module (300) and the rear structural interface (120) of the passenger body module (100) are corresponding structural interfaces configured to mechanically interconnect the passenger body module (100) with the rear body module (300).

30 Claims, 5 Drawing Sheets

(51) Int. Cl.
  *B62D 25/20* (2006.01)
  *B62D 27/06* (2006.01)
(58) Field of Classification Search
  CPC . A61B 2034/105; A61B 34/10; A61B 5/0537;
  A61F 2007/0054; A61F 2007/0056
  See application file for complete search history.

(56) References Cited

U.S. PATENT DOCUMENTS

| | | | | |
|---|---|---|---|---|
| 10,960,939 | B1* | 3/2021 | Kentley-Klay | B62D 27/023 |
| 2002/0057004 | A1* | 5/2002 | Corcoran | B62D 21/12 |
| | | | | 296/203.01 |
| 2005/0001455 | A1* | 1/2005 | White | B62D 29/008 |
| | | | | 296/203.01 |
| 2006/0237242 | A1* | 10/2006 | Burke | B62D 23/005 |
| | | | | 180/23 |
| 2007/0035148 | A1* | 2/2007 | Ellenrieder | B62D 21/15 |
| | | | | 296/35.1 |
| 2010/0102596 | A1* | 4/2010 | Chapman | F41H 7/048 |
| | | | | 296/193.03 |
| 2014/0062131 | A1* | 3/2014 | Green | B62D 25/085 |
| | | | | 296/187.09 |
| 2016/0325796 | A1* | 11/2016 | Czinger | B62D 27/023 |
| 2017/0203801 | A1* | 7/2017 | Hung | B62D 61/12 |
| 2018/0345777 | A1* | 12/2018 | Birnschein | B60W 10/18 |
| 2020/0114995 | A1* | 4/2020 | Anderson | B62D 63/025 |
| 2020/0164930 | A1* | 5/2020 | Carlden | B62D 63/025 |
| 2020/0324822 | A1* | 10/2020 | Kim | B62D 21/152 |
| 2020/0331533 | A1* | 10/2020 | Jin | B60R 19/02 |
| 2020/0353986 | A1* | 11/2020 | Kim | B62D 21/152 |
| 2020/0369328 | A1* | 11/2020 | Lichter | B60R 5/04 |
| 2020/0377155 | A1* | 12/2020 | Wu | B62D 25/06 |
| 2021/0101469 | A1* | 4/2021 | Ishibashi | B60K 11/04 |
| 2021/0101641 | A1* | 4/2021 | Kim | B62D 27/023 |
| 2021/0171101 | A1* | 6/2021 | Kim | B60G 7/02 |
| 2021/0171114 | A1* | 6/2021 | Mo | B62D 21/11 |

FOREIGN PATENT DOCUMENTS

| | | | | |
|---|---|---|---|---|
| DE | 19600933 | A1 | 7/1997 | |
| DE | 102015016954 | | 7/2016 | |
| IT | LU201000010 | A1 | 2/2012 | |
| WO | WO-9741010 | A1 * | 11/1997 | B62D 25/08 |
| WO | WO1999032346 | A1 | 7/1999 | |
| WO | WO2015061840 | A1 | 5/2015 | |
| WO | WO2017042562 | A1 | 3/2017 | |

* cited by examiner

VEHICLE BODY PLATFORM FOR AN AUTOMOBILE AND AUTOMOBILE COMPRISING SUCH A VEHICLE BODY PLATFORM

CROSS REFERENCE TO RELATED APPLICATIONS

The present application is a 35 U.S.C. § 371 U.S. National Phase application of International Application No. PCT/EP2018/082125, filed Nov. 21, 2018, which claims the benefit of Swiss Patent Application No. 01414/17, filed Nov. 22, 2017, both of which are incorporated herein by reference in their entireties.

The present invention is directed to a vehicle body platform, in particular to a vehicle body platform for an automobile (respectively car or passenger car) and to an automobile comprising such a vehicle body platform.

BACKGROUND OF THE INVENTION

WO 97/41010 A1 was published on 6 Nov. 1997 on behalf of Autokinetics Inc. and describes a modular vehicle body frame made up of several subassemblies or modules. The disclosed vehicle frame comprises passenger compartment module that includes a pair of side rails that extend along the lower and outer edges of the passenger compartment. The vehicle body frame further comprises a front suspension module that is attached to each of the side rails of the passenger compartment and is adapted to support a completed front suspension assembly as well as the drive train of the vehicle. The vehicle body frame further comprises a rear suspension module that also extends between the two side rails. According to the WO 97/41010 A1 the attachment of the front suspension module and the rear suspension module to the passenger compartment module side rails provides the primary lateral structural stability and rigidity for the entire vehicle frame, such that no other lateral reinforcement pieces are required.

WO 2016/192921 A1 was published on 8 Dec. 2016 on behalf of Bayerische Motoren Werke Aktiengesellschaft and discloses a group of motor vehicles. The document discloses providing a front-end module and a passenger compartment module of a vehicle, whereby both modules can be combined with each other without limitation although they both may be implemented in a variety of embodiments. Thus, vehicles belonging to various vehicle classes may be obtained. According to the WO 2016/192921 A1 multiple front-end modules having different distances between the engine supports and different passenger compartment modules having different distances between the front seats have as much as possible identical mating dimensions. The different embodiments of the front-end modules and the passenger compartment modules are manufactured in uniform deep-drawing dies for each module.

GB 2504997A was published on 19 Feb. 2014 on behalf of Caterham Technology and Innovation Limited and discloses a Sports car and a range of sports cars. According to the GB 2504997A each model has a substantially identical tub chassis but having different configurations to each other in terms of at least one of the group of features selected from front mid-engine layout, rear mid-engine layout, mid-engine layout; longitudinal driveline direction, transverse driveline direction, front subframe and rear subframe. According to this concept, the safety cells of the models are substantially identical, wherein the safety cells do not only include the chassis but in a preferred embodiment also comprise the interior trim, body wiring harness, steering columns and wheel airbag system, seats, windscreen, heating, ventilation and air conditioning (HVAC) system, door hinges, etc. Thus, the document proposes the integration of a high number of components into the safety cell, respectively chassis. The document discloses using a tube chassis of carbon fiber composite.

DE 10 2009 050 470 A1 was published on 5 May 2011 on behalf of Audi AG and discloses a construction kit and a method for producing a motor vehicle. The document teaches using a construction kit for producing motor vehicles having different types of propulsion systems, by providing different types of front-end modules to receive an internal combustion engine as well as a main vehicle chassis structure wherein all front-end modules can be connected with the same main vehicle chassis structure.

EP 1661794 A1 was published on 31 May 2006 on behalf of Dr. Ing. h.c. F. Porsche Aktiengesellschaft and is directed to a bodywork for a motor vehicle. The document discloses a car structure having a passenger compartment structure to accommodate two passengers and an adjoining supporting structure for the installation of a drive unit and for receiving chassis parts. The supporting structure is connected to the passenger compartment structure with the interconnection of holding elements. The supporting structure comprises a receiving bridge for the chassis parts, whereby the receiving bridge is separated from the passenger compartment structure by a tubular frame. According to the EP 1661794 A1 the receiving bridge comprises first and second connecting sections arranged at a distance from one another in the longitudinal direction of the motor vehicle. Therefore, the first connecting sections are connected to upright tubular elements of the tubular frame and the second connecting sections are connected to upright frame elements of a supporting frame. Thus, according to the document a passenger compartment structure and supporting structure that have particular stiffness can be obtained, whereby the passenger compartment structure is formed with particular measures for protection of passengers.

DE 10 2015 016 954 A1 was published on 21 Jul. 2016 on behalf of Daimler AG and is directed a modular design for producing of different versions of passenger cars. Therefore, said application discloses using multiple first variants being different from each other and multiple second variants being different from each other. The first variants comprise respective first interfaces and the second variants comprise respective second interfaces that are connectable with the first interfaces. According to the DE 10 2015 016 954 A1 the respective interfaces are arranged in such geometrical areas such that the respective first variant is connectable with the respective second variant by means of the same production equipment. Thus, by being able to use the same production equipment, different variations of a passenger car can be produced.

SUMMARY OF THE INVENTION

When compared to automobiles that were available some decades ago, most modern automobiles have a much higher technical complexity in design and fabrication. For example, modern automotive forming technology including advanced non-linear numerical simulations allows development and manufacturing of very sophisticated respectively complex automotive exterior design. The same holds true for automotive aerodynamics where also an increasing number of active aerodynamic components became available. Even more, enormous numbers of electric and electronic systems may be present in modern cars, including extensive systems for climate regulation in various zones of the passenger compartment, passenger safety systems, systems for increasing seating comfort, navigation and passenger entertainment systems as well as advanced driver assistance systems (ADAS) and others. Furthermore, various propulsion systems, respectively embodiments of powertrains are available including different types of internal combustion engines and electric engines as well as combinations thereof. These propulsion systems usually also require different types of energy sources (e.g. fuel tanks, natural or hydrogen gas tanks, batteries etc.) as well as may have an impact on the design of weight distribution. In addition, modern powertrains—in particular hybrid-type powertrains—in many cases comprise complex drivetrains that may result in assembly line bottlenecks.

Notwithstanding these developments and theoretically possible resulting variations, in reality the number of product variations available to the customer of a specific automobile is still relatively limited. A main reason being that increasing the variant diversity of modern automobiles turns out to be relatively unproblematic as long as it includes auxiliary components, interior and exterior color, parts of the interior design and electronic systems. As well, customers may choose between different types of internal combustion engines. However, already such a relatively limited variability regarding internal combustion engines typically necessitates major changes in other components such as the internal installation space and surrounding support structure for the engine in the body vehicle. As well, for example automobiles equipped with diesel type engines usually require different HVAC-systems than automobiles equipped with gasoline engines. In order to be able to accommodate and anchorage certain modules of these various systems, in many cases major parts of a vehicle's body have to be redesigned, leading to significantly increased development and production costs as different assembly lines and production tools are necessary. At the same time the life cycle of many systems—in particular the entertainment systems as well as ADAS, but also electric powertrains—is typically significantly lower than that of other components, such as e.g. braking systems, vehicle body or the main components of internal combustion engines. Thus, the total service life of modern automobiles in many cases is significantly lower than the theoretical service life of their most important components. At the same time updates and refurbishment—respectively retrofitting—of most modern automobiles is only possible if significant modifications in the vehicle body are done.

The present invention therefore is directed to a vehicle body platform that allows to implement a highly versatile vehicle architecture. As will be described in more detail below, a vehicle body platform according to the present invention allows a highly diverse vehicle architecture that is not limited to a diversity of the structural architecture (e.g. chassis) but may also extend to powertrain architecture, HVAC architecture and of other aspect of a vehicle.

In order to solve at least one of the aforementioned problems, a vehicle body platform for an automobile (e.g. a sports car) according to the present invention typically comprises a passenger body module having a front structural interface and a rear structural interface as well as a front body module comprising a rear structural interface and a rear body module comprising a front structural interface. According to the invention the rear structural interface of the front body module and the front structural interface of the passenger body module are corresponding structural interfaces configured to mechanically interconnect the passenger body module with the front body module. As well, the front structural interface of the rear body module and the rear structural interface of the passenger body module are corresponding structural interfaces configured to mechanically interconnect the passenger body module with the rear body module. A passenger body module may comprise a firewall arranged adjacent to a rear structural interface to be connected to a rear body module. Thus, passenger safety can be increased, in particular if a fuel tank and/or battery and/or internal combustion engine is arranged in a rear body module.

A vehicle body platform having a higher degree of modularity may be obtained if the vehicle body platform further comprises a passenger extension body module that is configured to be arranged between the passenger body module and the rear body module. Such a passenger extension body module may e.g. be used to obtain a vehicle with a passenger compartment that has an increased volume—such as for arranging an additional seat row or to add space for luggage. Hence, a passenger extension module may also be used to accommodate a luggage compartment. A passenger extension body module may comprise a firewall that may be arranged adjacent to a rear structural interface to be connected to a rear body module. Thus, passenger safety can be increased, in particular if a fuel tank and/or battery and/or internal combustion engine is arranged in a passenger extension body module.

A vehicle body platform may also have two or more different types of passenger extension body modules that may be installed alternatively or complementarily in between a passenger compartment body module and a rear body module.

Good results may be obtained if the passenger extension body module comprises a front structural interface configured to be mechanically interconnected with the rear structural interface of the passenger body module and further comprises a rear structural interface configured to be mechanically interconnected with the front structural interface of the rear body module.

In a variation of the invention the rear structural interface of the passenger body module and the rear structural interface of the passenger extension body module are identical types of interfaces configured to be mechanically interconnected with the same mechanical connecting points of the front structural interface of the rear body module. Within this context, connecting points may e.g. be openings configured to receive screws or bolts.

In a variation of the invention, the rear structural interface of the front body module and the rear structural interface of the passenger extension body module are different types of interfaces configured to be mechanically interconnected with different mechanical connecting points of the front structural interface of the passenger body module. Within this context, also identical mechanical connection points may be combined with additional/alternative connection points.

In order to increase the variability of the vehicle body platform, the vehicle body platform may also comprise a front extension body module configured to be arranged between the passenger body module and the front body module. Hence, the hood region of a vehicle can be extended if needed.

In a variation of the invention at least part of a front extension body module may be an integral body, e.g. comprise a self-supporting structure. However, a front extension body may also comprise multiple bodies that are not mechanically interconnected with each other prior to the assembly of the vehicle body or are only mechanically interconnected with each other by means of an auxiliary structure that may be at least partially removed after assembly of the vehicle body.

A vehicle body platform may also have two or more different types of front extension body modules that may be installed alternatively or complementarily in between the passenger body module and the front body module.

In a variation of the invention, the front extension body module may comprise a front structural interface configured to be mechanically interconnected with the rear structural interface of the front body module as well as a rear structural interface configured to be mechanically interconnected with the front structural interface of the passenger body module. Thus, obtaining variations of a vehicle body is facilitated.

In a variation of the invention the rear structural interface of the front body module and the rear structural interface of the front extension body module are identical types of interfaces configured to be mechanically interconnected with same mechanical connecting points of the front structural interface of the passenger body module. Within this context, connecting points may e.g. be openings configured to receive screws or/and bolts.

In a variation of the invention, the rear structural interface of the front body module and the rear structural interface of the front extension body module are different types of interfaces configured to be mechanically interconnected with different mechanical connecting points of the front structural interface of the passenger body module. Within this context, also identical mechanical connection points may be combined with additional/alternative mechanical connection points.

In order to increase passenger safety, according to a variation of the invention the vehicle body platform may comprise a front-end body module that has a rear structural interface configured to be mechanically interconnected with a front structural interface of the front body module. Good results may be obtained if the front-end body module is arranged diametrically opposite to the passenger body module of the front body module. A front-end body module may be configured to absorb impact energy, as will be explained in more detail below. In a variation of the invention, the front-end body module may be interconnected detachably with the front body module. Thus, easy replacement of the foremost part of the vehicle body structure in case of e.g. minor frontal collisions becomes possible.

In a variation of the present invention the vehicle body platform comprises a rear-end body module having a front structural interface configured to be mechanically interconnected with a rear structural interface of the rear body module. Good results may be obtained if the rear-end body module is arranged adjacent to the rear body module and diametrically opposite to the passenger body module. In a variation of the invention the rear-end body module comprises a crash management system.

In order to increase structural stiffness and/or decrease total weight, the vehicle body platform may comprise an auxiliary stiffening structure that mechanically interconnects the front body module with the passenger body module. An auxiliary stiffening structure may comprise a tie rod, as will be shown in more detail below. Good results may be obtained if the auxiliary stiffening structure is arranged at a side of the vehicle body platform that during operation of the vehicle is directed away from the roadway.

A highly versatile variation of a vehicle body platform according to the invention which has a high mechanical competence can be obtained if at least one of the front and/or rear structural interfaces of the body modules comprises at least one flange that has at least one contact face configured for load transfer to an adjacent body module as will be explained in more detail below. Hence, in a variation of the invention, at least one of the structural interfaces is a flange connection. Good results may be obtained if the flange is arranged at an angle bracket. Thus, forces can be transferred from the contact face e.g. into an adjacent rail. In order to obtain a more balanced load transfer an angle bracket may comprise at least one stiffening rip, as will be shown in more detail below. In a variation of the invention, the flange is at least partially composed of at least two angle brackets that have complementary contact faces which together form a composed contact face of a composed fixing plate. Thus, a highly balanced/distributed load transfer can be obtained and total weight of the vehicle body be decreased. In order to allow fast and easy establishment of mechanical interconnections between different body modules, an angle bracket, respectively a composed fixing plate, may comprise at least one bore to receive at least one fastener, such as a bolt or screw. At least one bore may be arranged such that it corresponds to at least one bore arranged in a flange of a structural interface of an adjacent body module.

In a variation of the invention the rear structural interface of the front body module comprises a left rear structural interface member and a right rear structural interface member In such a variation of a vehicle body platform according to the invention the front body module may also comprise a left front rail extending from the left rear structural interface member essentially in the longitudinal direction (essentially parallel to the x-axis) of the front body module and a right front rail extending from the right rear structural interface member essentially in the longitudinal direction (essentially parallel to the x-axis) of the front body module.

Within the context of the present invention the standardized SAE-coordinate system will be used. Hence, the longitudinal axis (x-axis) of the vehicle body platform (as well as of each vehicle body module) is the axis parallel to the ground/road along the length of a vehicle in which a vehicle body made from the vehicle body platform according to the present invention is embodied. The lateral axis (y-axis) is orthogonal to the longitudinal axis and parallel to the ground/road. The vertical axis (z-axis) is orthogonal to both the longitudinal axis and the lateral axis. If not stated otherwise, the standard forward driving direction shall be referred as the positive direction (+x-direction) of the longitudinal axis (x-axis), the coordinate system being a right-handed coordinate system.

In a variation of the present invention the rear structural interface of the front extension body module comprises a left rear structural interface member and a right rear structural interface member and the front extension body module comprises a left front extension rail extending from a right rear structural interface member essentially in the longitudinal direction (essentially parallel to the x-axis) of the front extension body module and a right front extension rail extending from the right rear structural interface member essentially in the longitudinal direction (essentially parallel to the x-axis) of the front extension body module. Good results may be obtained if the front structural interface of the front extension body module comprises a left front structural interface member and a right front structural interface member, the left front structural interface member and the left rear structural interface member of the front extension module and the left front extension rail being essentially arranged on a straight line in the longitudinal direction (essentially parallel to the x-axis) of the front extension body module and the right front structural interface member and the right rear structural interface member of the front extension module and the right front extension rail being essentially arranged on a straight line in the longitudinal direction (essentially parallel to the x-axis) of the front extension body module.

In a variation of the vehicle body platform according to the present invention, when the passenger body module and the front extension body module and the front body module are in a mechanically interconnected state, the front structural interface of the passenger body module and the front structural interface of the front extension body module and the front structural interface of the front body module are essentially arranged on a straight line in the longitudinal direction (essentially parallel to the x-axis) of the passenger body module. In such a variation of the invention, a left front rail and a left front extension rail may be essentially arranged on a straight line in the longitudinal direction and a first right front rail and a right front extension rail may be essentially arranged on a second straight line in the longitudinal direction.

In a variation of the present invention, the rear body module may comprise a truss, respectively may comprise a truss structure. Thus, a relatively lightweight vehicle body may be obtained. At the same time, such a variation offers multiple advantages if an engine, such as an internal combustion engine and/or one or multiple electric motors, is/are at least partially arranged in the rear body module, as will be explained in more detail below. For some types of engines good results may be obtained if the truss structure is made from a steel. However, also other types of materials may be used, depending on the type of vehicle, such as aluminum, titanium, magnesium and fiber reinforced plastics or combinations thereof. Within the context of the present invention aluminum, titanium and magnesium also refer to their alloys. A highly versatile and mechanically competent rear body module may be obtained if the truss is at least partially made from tubular profiles. In a variation of the invention the truss may embodied as a space frame comprising profiles e.g. being interconnected by welding joints or nodes made from die-cast aluminum.

In a variation of the present invention, the mechanical interconnections between the structural interfaces are embodied as detachable mechanical interconnections. Thus, maintenance, repair and retrofitting of a vehicle comprising a vehicle body made from a vehicle body platform according to such a variation of the invention are facilitated. In a first variation, essentially all interfaces are embodied as detachable mechanical interconnections. In a second variation, at least some of the interfaces between vehicle body modules are non-detachable, respectively can only be released by inducing local changes (such as by cutting or welding) in the vehicle body modules affected. Good results may be obtained if the detachable mechanical interconnections are established by fasteners. For some applications, the fasteners may comprise at least one screw and/or threaded bolt and/or rivet. Within this context, a detachable mechanical interconnection is a connection that can be released without causing (significant) damage to the affected vehicle body modules (respectively the structural interfaces of these modules). However, a detachable mechanical interconnection may also comprise at least some fasteners that have to be destroyed in order to release the connection, such as e.g. rivets.

In a variation of a vehicle body platform according to the invention, the passenger body module comprises a floorpan that is made from a sheet material. Good results may be obtained if the floorpan is at least partially made from an aluminum or a steel. In order to reduce weight, the floorpan may also be at least partially made from a fiber reinforced plastic. As such, fiber reinforced plastics comprising e.g. glass fibers, carbon fibers, aramid fibers, basalt fibers or combinations thereof may be used. For some applications, the passenger body module may comprise an upper framework arranged on and mechanically interconnected with the floorpan.

In a variation of the invention the passenger body module comprises at least one tunnel extending along the passenger body module in longitudinal direction (essentially parallel to the x-axis) of the passenger body module. Thus, at least part of a vehicle's powertrain can be arranged in the tunnel as well as the structural competence of a vehicle body can be improved.

In a variation of the invention when the modules of the vehicle body platform are in an interconnected state, the tunnel is part of a passageway that extends along at least two body modules in longitudinal direction (essentially parallel to the x-axis) of the vehicle body. In a variation, this passageway may be integrally made. In another variation, said passageway may be made from multiple segments. As such, a first segment may be a first tunnel arranged in the passenger body module, which is interconnected with a second segment being a second tunnel arranged in a front extension body module (if present).

In a variation of the invention at least one of the body modules comprises at least one anchorage point foreseen to fasten at least part of a body shell to said body module.

In a variation of the invention, an internal combustion engine is arranged in the rear body module. The internal combustion engine may be a mid-engine. Alternatively or in addition, other types of engines may be arranged in the rear body module, such as an electric powertrain. Alternatively or in addition, at least one electric powertrain may be arranged in the front body module. Thus, vehicles comprising hybrid powertrain can be obtained. Within the context of the present invention, an internal combustion engine may e.g. be a reciprocating piston engine (e.g. Otto cycle or Diesel cycle) or a rotary engine (e.g. Wankel cycle) but is not limited to these types of engines.

Alternatively or in addition an electric motor may be arranged in the rear body module. For some types of vehicles, multiple electric motors may be arranged in the rear body module. Thus, e.g. full electric vehicles which offer an advantageous weight can be obtained.

According to a variation of the present invention, different types of passenger extension body modules may be provided, the different types of passenger extension body modules each being configured to be used with at least one type of powertrain that is at least partially arranged in the rear body module. Thus, in a variation of the invention an essentially identical variation of a rear body module may be used for different types of powertrains (respectively motors/engines arranged at least partially in the rear body module) while differing weight distribution, total weight and resulting load paths/transfer as well as requirements regarding installation space are accounted for by the respective variations of a passenger extension body module. Thus, according to such a variation of the invention the same variation of a rear body module which (if compared to the passenger extension body module) typically has a relatively complicated design (e.g. due to the rear wheel suspension areas and anchoring supports for an engine) may be used for different types of powertrains. Within this context, essentially identical variations of a rear body module may still differ from each other in certain minor aspects, such as e.g. the type of anchoring supports for an engine. In addition to the structural interfaces, the body modules may also comprise other types of interfaces. As such, the front body module e.g. may comprise a rear electric interface configured to be electrically interconnected with a front electric interface of the passenger body module. In a variation, the rear electric interface of the front body module may be configured to be electrically interconnected with a front electric interface of the front extension body module (if present) and the front extension body module may comprise a rear electric interface configured to by electrically interconnected with the front electric interface of the passenger body module. Electric interfaces may be used for signal and/or power transmission.

Alternatively or in addition, the front body module may comprise a rear fluidic interface configured to be fluidically interconnected with a front fluidic interface of the passenger body module. A fluidic interface may e.g. be used for fluidic transport of the HVAC-system. In a variation, the rear fluidic interface of the front body module may be configured to be fluidically interconnected with a front fluidic interface of the front extension body module (if present) and the front extension body module may comprise a rear fluidic interface configured to by fluidically interconnected with the front electric interface of the passenger body module. In a variation of the invention the rear body module comprises a front electric interface configured to be electrically interconnected with a rear electric interface of the passenger body module. Good results may be obtained if the front electric interface of the rear body module is configured to be electrically interconnected with a rear electric interface of the passenger extension body module (if present) and the passenger extension body module comprises a front electric interface configured to by electrically interconnected with the rear electric interface of the passenger body module. In a variation of the invention, the rear body module comprises a front fluidic inter-face configured to be fluidically interconnected with a rear fluidic interface of the passenger body module. In a variation, the front fluidic interface of the rear body module may be configured to be fluidically interconnected with a rear fluidic interface of the passenger extension body module (if present) and the passenger extension body module comprises a front fluidic interface configured to by fluidically interconnected with the rear fluidic interface of the passenger body module.

According to the invention a passenger body module may also be selected from a multiplicity of passenger body modules and/or a front body module may be selected from a multiplicity of front body modules and/or a rear body module may be selected from a multiplicity of rear body modules and/or a front extension body module may be selected from a multiplicity of front extension body modules and/or a passenger extension body module may be selected from a multiplicity of passenger extension body modules.

The present invention is also directed to providing a passenger body module and/or a front body module and/or a read body module and/or a front extension body module and/or a passenger extension body module and/or a front-end body module and/or a rear-end body module for a vehicle body platform as described herein.

The present invention is also directed to providing a vehicle, e.g. an automobile such as a sports car, comprising a vehicle body platform as described herein. Due to the vehicle body platform according to the invention, e.g. an automobile can be easily customized to correspond to customer requirements.

BRIEF DESCRIPTION OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purpose of illustrating the invention, an embodiment this is presently preferred, in which like numerals represent similar parts throughout the several views of the drawings, it being understood, however, that the invention is not limited to the specific methods and instrumentalities disclosed.

Figure 1:
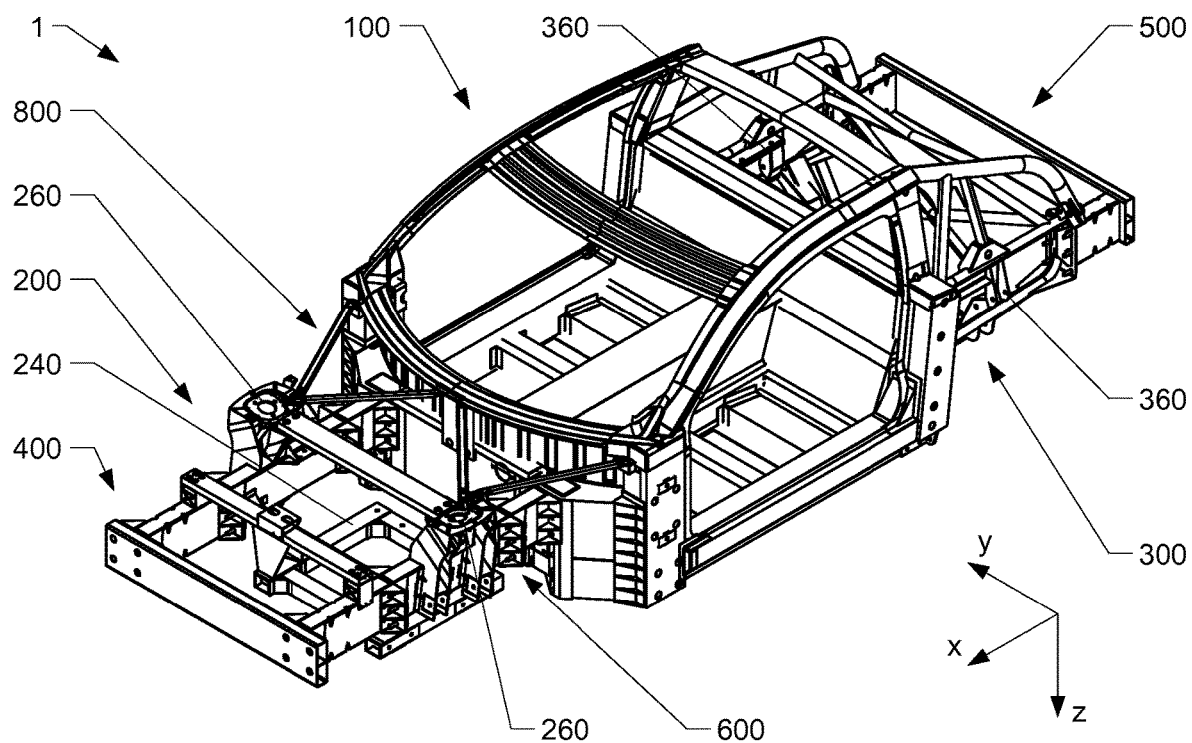
FIG. 1 schematically shows a vehicle body made from a variation of vehicle body platform according to the present invention in a perspective view.
Figure 2:
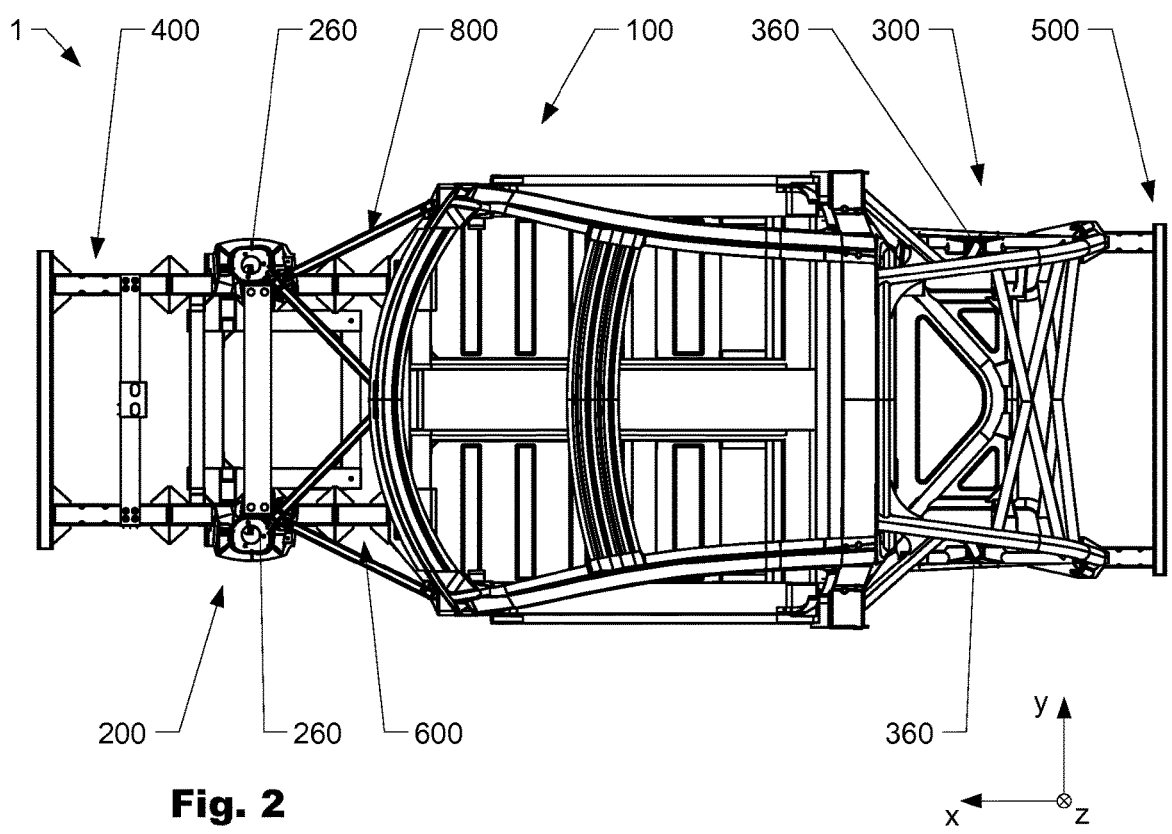
FIG. 2 schematically shows the variation of a vehicle body platform of FIG. 1 in a top view.

FIGS. 1 and 2 shows a first variation of a vehicle body platform 1 comprising multiple modules (as will be explained in more detail hereinafter) in an assembled state, forming a vehicle body. The vehicle body platform 1 shown comprises a passenger body module 100 providing an inner volume that can be used to accommodate a passenger compartment of an automobile. The vehicle body platform 1 further comprises a front body module 200 arranged in longitudinal direction (x) in front of the passenger body module 100. The front body module 200 may be used in order to accommodate an engine of an automobile, such as e.g. an electric powertrain and/or an internal combustion engine. As well, in the variation of vehicle body platform 1 shown, the front body module 200 comprises front wheel suspension areas 260 to receive the suspensions (respectively axes) of the front wheels (both not shown) of an automobile. In the variation shown, an auxiliary stiffening structure 800 is arranged essentially above the front body module 200 (with respect to a non-shown driveway being below the front body module 200). The auxiliary stiffening structure 800 comprises multiple tie rods mechanically interconnecting the front body module 200 with the passenger body module 100, thereby increasing the stiffness of the assembled vehicle body platform 100. In between the front body module 200 and the passenger body module 100 a front extension body module 600 is arranged. The front body module 200 of the variation of a vehicle body platform 1 shown further comprises a front engine support structure 240 arranged to support an optional powertrain (not shown)

to be arranged in the front body module 200. The variation of a vehicle body platform 1 shown further comprises a front-end body module 400 that is arranged in the longitudinal direction (x) in front of and mechanically interconnected with the front body module 200 and will be explained in more detail with respect to the variation shown in FIG. 5.

The variation of a vehicle body platform as shown in FIGS. 1 and 2 further comprises a rear body module 300 arranged in longitudinal direction (x) essentially behind the passenger body module 100 with respect to the driving direction. The rear body module 300 may be used in order to accommodate at least part of a powertrain of an automobile, such as e.g. an internal combustion engine and/or an electric powertrain. As well, in the variation of vehicle body platform 1 shown, the rear body module 300 comprises rear wheel suspension areas 360 to receive the suspensions (respectively axes) of the rear wheels (wheels not shown) of an automobile. The variation of a vehicle body platform 1 shown further comprises a rear-end body module 500 that is arranged in the longitudinal direction (x) in front of and mechanically interconnected with the rear body module 300.

Figure 3:
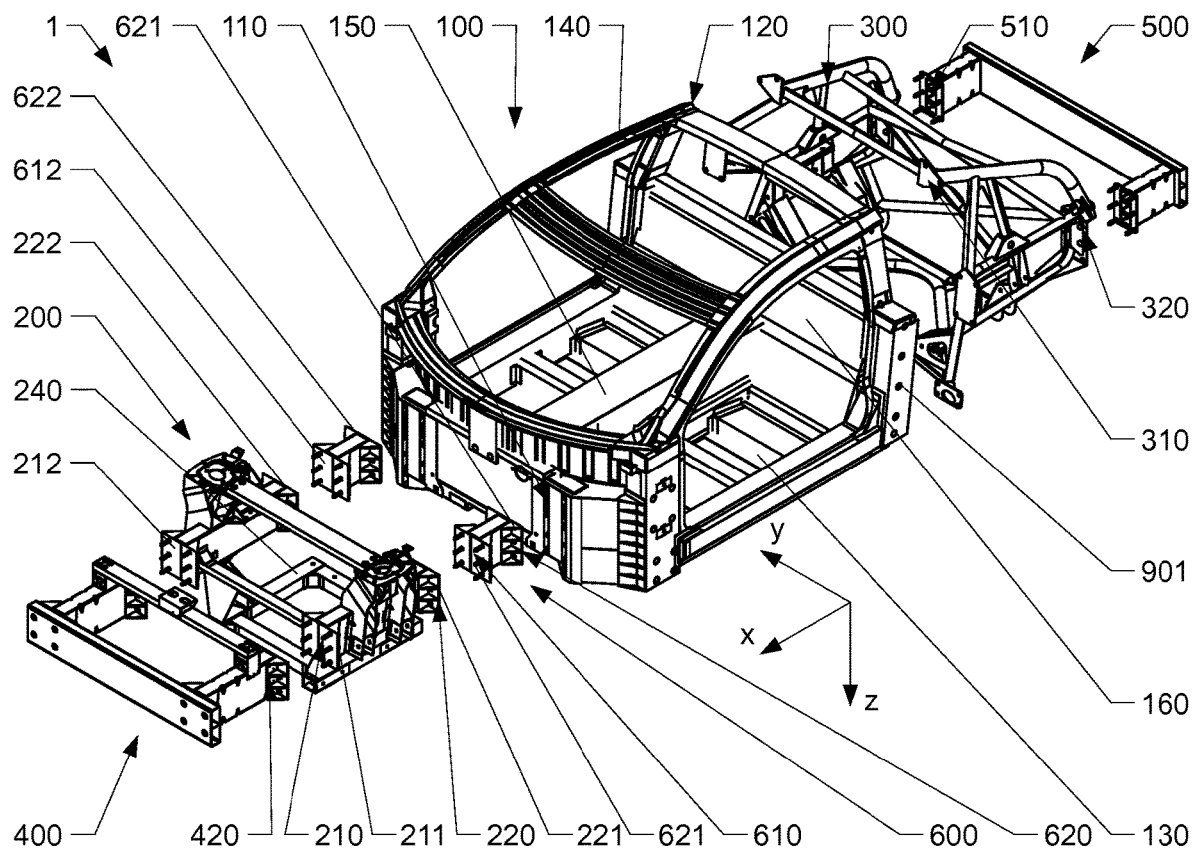
FIG. 3 schematically shows the variation of a vehicle body platform of FIGS. 1 and 2 in a partially exploded perspective view.
Figure 4:
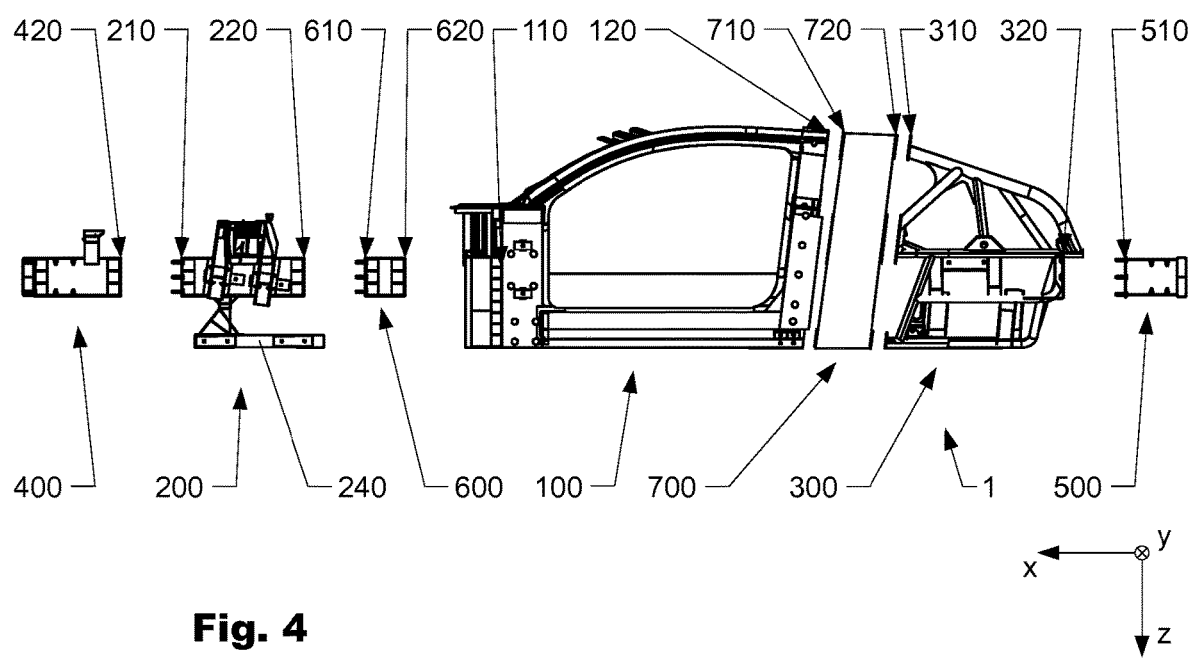
FIG. 4 schematically shows a variation of a vehicle body platform in a partially exploded side view.
Figure 5:
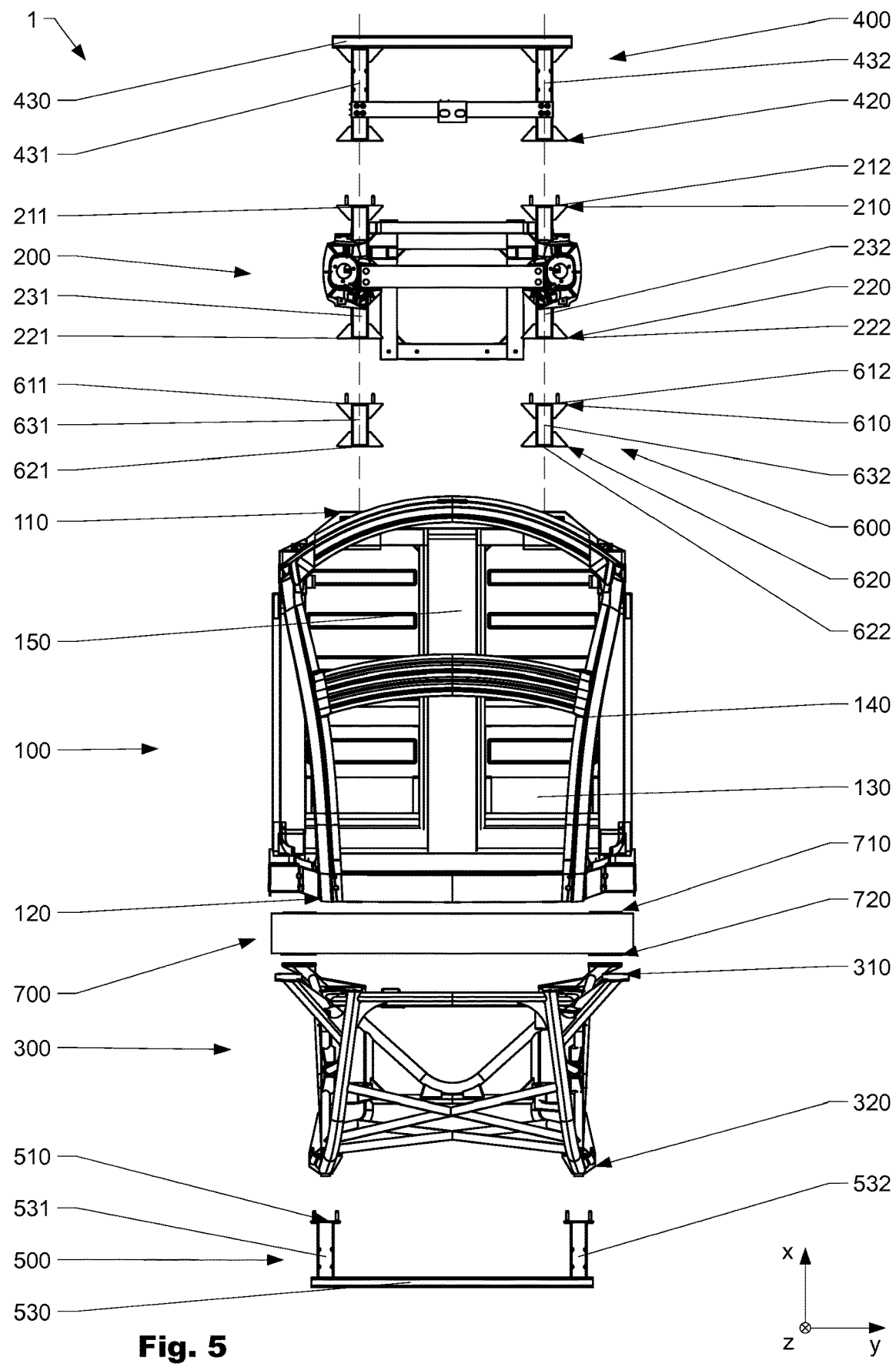
FIG. 5 schematically shows the variation of a vehicle body platform of FIG. 4 in a partially exploded top view.

As illustrated in FIGS. 3 to 5, the various modules of the vehicle body platform 1 are interconnected by means of structural interfaces. The passenger body module 100 comprises a rear structural interface 120. The rear body module 300 comprises a front structural interface 310 which corresponds to the rear structural interface 120 of the passenger body module 100 and is configured to mechanically interconnect the passenger body module 100 with the rear body module 300. As shown in FIGS. 4 and 5, in a variation of the invention the vehicle body platform 1 may also comprise a passenger extension body module 700 that is configured to be arranged between the passenger body module 100 and the rear body module 200. The passenger extension body module 700 shown comprises a front structural interface 710 configured to be mechanically interconnected with the rear structural interface 120 of the passenger body module 100 and a rear structural interface 720 configured to be mechanically interconnected with the front structural interface 510 of the rear-end body module 500. The rear body module 300 of the variations of the inventions shown in the Figures comprises a truss, respectively a truss structure which is at least partially made from tubular steel profiles that are interconnected by welding joints. By this, a mechanical support structure for mounting at least part of a powertrain, such as one comprising an internal combustion engine, can be obtained which offers sufficient anchoring points for fastening the engine as well as other components of the powertrain. As well, ventilation, respectively cooling, of the powertrain can be enhanced.

The variations of a vehicle body platform 1 as shown in the Figures comprise a front extension body module 600 configured to be arranged between the passenger body module 100 and the front body module 200. Nevertheless, also in this variation the front body module 200 comprises a rear structural interface 220 that is corresponding with the front structural interface 110 of the passenger body module 100 and configured to mechanically interconnect the passenger body module 100 with the front body module 200 directly. However, in the variation of the vehicle body platform 1 shown having a front extension body module 600, said front extension body module 600 comprises a front structural interface 610 configured to be mechanically interconnected with the rear structural interface 220 of the front body module 200 and a rear structural interface 620 configured to be mechanically interconnected with the front structural interface 110 of the passenger body module 100. Thus, the hood region of a vehicle can be extended in longitudinal direction (x).

Within the context of the present invention the structural interfaces of the vehicle body platform 1 may each comprise a single structural junction or may each comprise multiple structural members (respectively junctions), as e.g. is illustrated in FIGS. 3 and 5 and will be explained subsequently in more detail with respect to the front-end body module 400, the front body module 200 and the front extension body module 600. In the variation of a vehicle body platform 1 shown, the passenger body module 100 comprises a floorpan 130 made from a metal sheet and comprising a tunnel 150 extending in longitudinal direction (x) and configured to accommodate part of a vehicle's powertrain. As well, the passenger body module 100 shown comprises an upper framework 140, respectively a truss. As well, this variation of a passenger body module comprises a firewall 160 arranged adjacent to the rear body module 300.

In the variation of vehicle body platform 1 as shown in FIG. 5, the front body module 200 comprises a left rear structural interface member 221 and a right rear structural interface member 222. In addition, it comprises a left front rail 231 extending from a left rear structural interface member 221 essentially in the longitudinal direction (x) of the front body module 200 and a right front rail 232 ex-tending from the right rear structural interface member 222 essentially in the longitudinal direction (x) of the front body module 200. The front structural interface 610 of the front extension body module 600 comprises a left front structural interface member 611 and a right front structural interface member 612, the left front structural interface member 611 corresponding to the right left structural interface member 221 of the front body module 200 and the right front structural interface member 612 corresponding to the right rear structural interface member 222 of the front body module 200. The front extension body module 600 further comprises a left front extension rail 631 extending from the left front structural interface member 611 essentially in the longitudinal direction (−x) of the front extension body module 600 to a left rear structural interface member 621. As well it comprises a right front extension rail 632 extending from the right front structural interface member 612 essentially in the longitudinal direction (−x) of the front extension body module 600 to a right rear structural interface member 622. In such a variation of the invention, the left rear structural interface member 621 and the right rear structural interface member 622 may then be interconnected with a corresponding front structural interface 110 of the passenger body module 100, respectively left and right members of the front structural interface. Thus, as indicated with the horizontal dashed lines in FIGS. 4 and 5 the passenger body module 100 and the front extension body module 600 and the front body module 200 can be arranged such that front structural interface 110 of the passenger body module 100 and the front structural interface 610 of the front extension body module 600 and the front structural interface 210 of the front body module 200 are essentially arranged on a straight line in the longitudinal direction (x) of the vehicle body platform 1. At the same time the assembly comprising the left front extension rail 631 and the left front rail 231 and the associated structural interface members 621, 611, 221, 211 as well as assembly comprising the right front extension rail 632 and the right front rail 232 and the associated structural interface members 622, 612, 222, 212 are both essentially arranged on straight lines in the longitudinal direction (x) of the vehicle body platform 1.

As e.g. indicated in FIGS. 4 and 5, a variation of a car vehicle body platform 1 may also comprise a front-end body module 400 having energy absorbing members to increase passenger safety as well as decrease damage to the vehicle in case of a collision. In the variation shown, the front-end body module 400 therefore comprises a bumper beam 430 interconnected with a left and a right crash box 431, 432. The front-end body module 400 comprises a rear structural interface 420 arranged to be mechanically interconnected with the front structural interface 210 of the front body module 200, respectively with its left and its right front structural interfaces 211, 212. Thus, e.g. in case of a head-on collision kinetic energy can be absorbed by the crash boxes 431, 432 and induced loads be transmitted via the left and the right front rails 231, 232 as well as the left and the right front extension rails 631, 632 to front structural interface 110 of the passenger body module 100 and subsequently be taken up by the passenger body module 100. As also indicated e.g. in FIG. 5, a variation of a car vehicle body platform 1 may also comprise a rear-end body module 500 comprising energy absorbing members. In the variation shown, the rear-end body module 500 therefore comprises a bumper beam 530 interconnected with a left and a right crash box 531, 532. Thus, passenger safety in case of rear-end collisions can be improved. As well, using such variations of vehicle body platforms 1 having front and/or rear-end body modules 400, 500 as described herein damage to the total vehicle body in case of collisions can be reduced and repair of the body structure after collision can be facilitated as affected body modules can be replaced and/or disassembled relatively easily.

Figure 6:
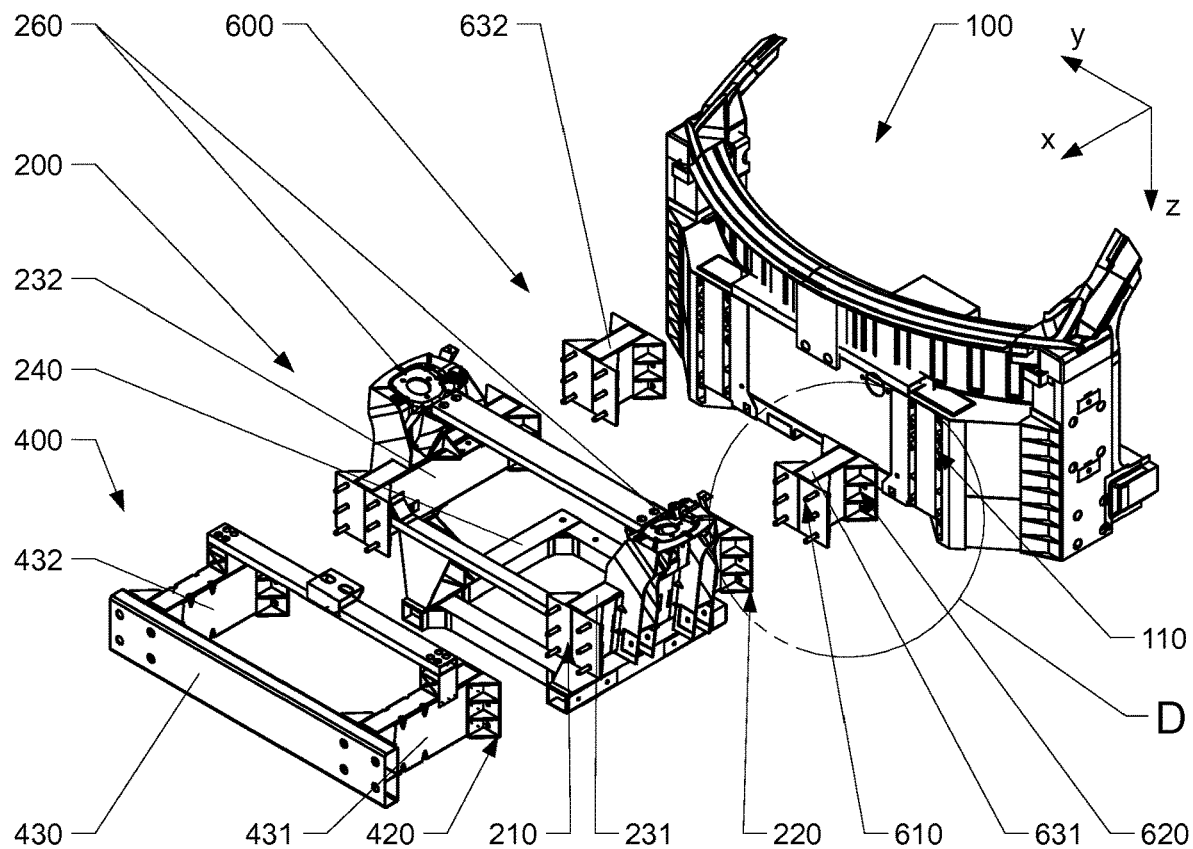
FIG. 6 schematically shows a front section of a vehicle body platform (the passenger body module being partially clipped) in a partially exploded view.
Figure 7:
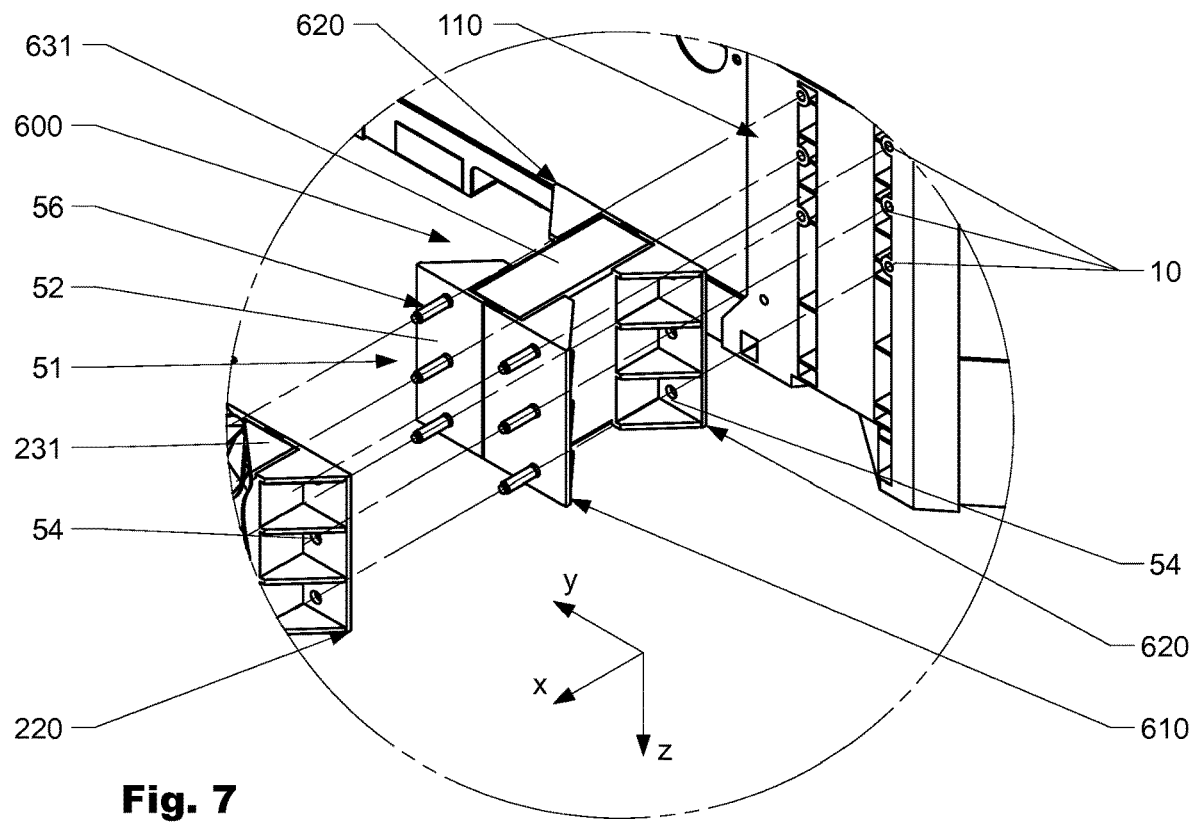
FIG. 7 schematically shows detail D of FIG. 6.
Figure 8:
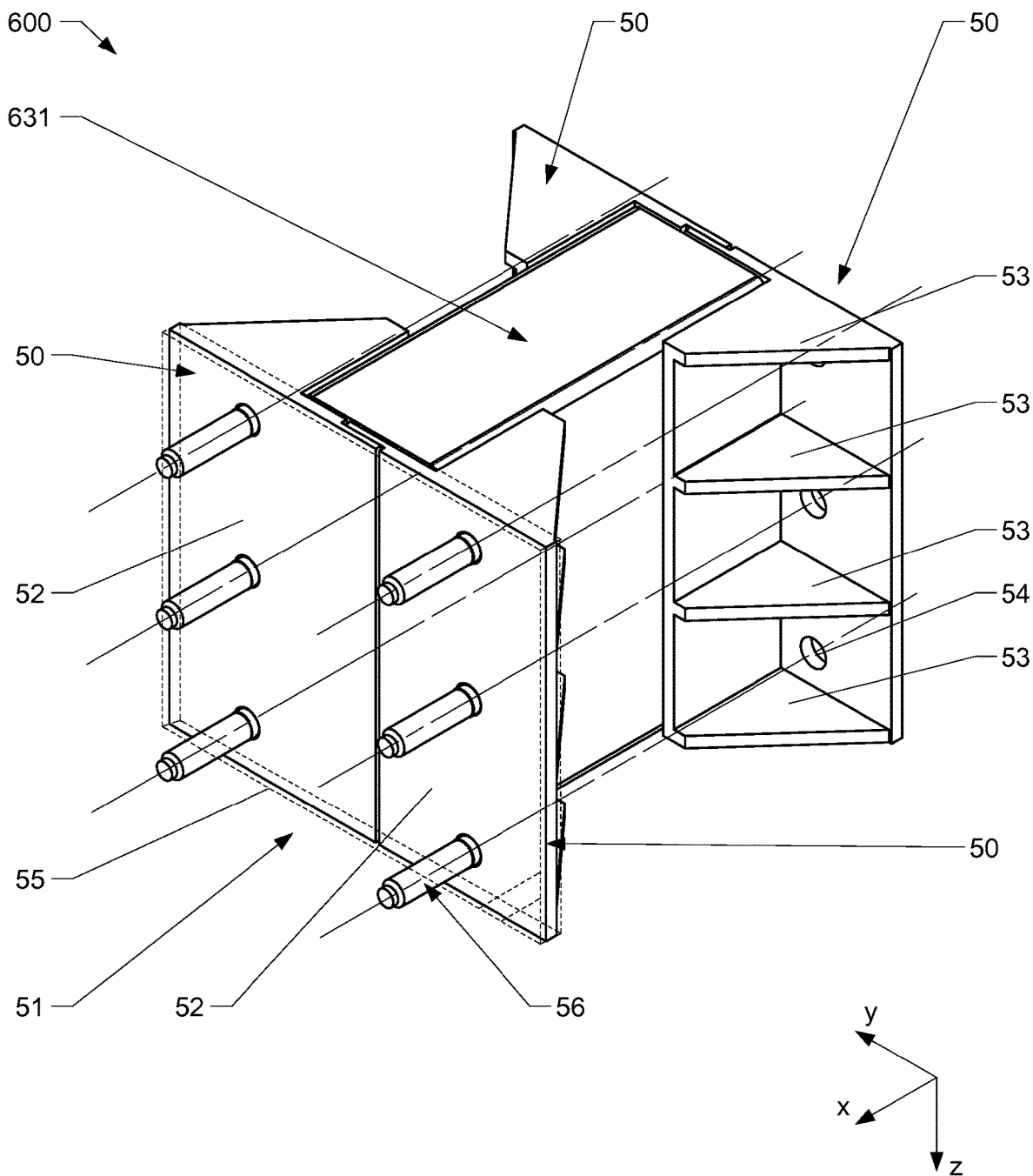
FIG. 8 schematically shows part of a front extension module in a perspective view.

As illustrated in FIGS. 6 to 8, according to a variation of the present invention, at least some of the front and/or rear structural interfaces 110, 120, 210, 220, 310, 320, 420, 510, 610, 620, 710, 720 comprise flanges 51 having at least one contact face 52 configured for load transfer to an adjacent body module. As shown in FIGS. 7 and 8, the flanges 51 may be arranged at angle brackets 50, whereby multiple angle brackets 50 may be used (see FIG. 8). In the embodiment shown, each flange 51 is composed of two angle brackets 50 having complementary contact faces 52 which together form a composed contact face of a composed fixing plate 55 as indicated by the volume defined by the dotted lines in FIG. 8. The variation of an angle bracket 50 shown comprises stiffening rips 53 which helps to obtain a more balanced load transfer from the contact face 53 into the body module, which in FIG. 8 is a left front extension rail 631. As illustrated in FIGS. 7 and 8 the angle brackets 50, respectively a composed fixing plate 50, may comprise bores 54 to receive at fastener 56 which in the variation shown are threaded bolts. The bores 54 are arranged such that at least some of them correspond to at least some of the bores bore arranged in a flange 51 of a structural interface of an adjacent body module.

As indicated in FIGS. 6 and 7, in the variations of a vehicle body platform 1 shown, the rear structural interface 220 of the front body module 200 and the rear structural interface 620 of the front extension body module 600 are identical types of interfaces configured to be mechanically interconnected with same mechanical connecting points 10 (e.g. bores) of the front structural interface 110 of the passenger body module 100.

REFERENCE NUMERALS

| | |
|---|---|
| 1 | Vehicle body platform |
| 10 | Connecting point |
| 50 | Angle bracket |
| 51 | Flange |
| 52 | Contact face |
| 53 | Stiffening rip |
| 54 | Bore (opening) |
| 55 | Composed fixing plate |
| 56 | Fastener |
| 100 | Passenger body module |
| 110 | Front structural interface |
| 120 | Rear structural interface |
| 130 | Floorpan |
| 140 | Upper framework |
| 150 | Tunnel |
| 160 | Firewall |
| 200 | Front body module |
| 210 | Front structural interface |
| 211 | Left front structural interface member |
| 212 | Right front structural interface member |
| 220 | Rear structural interface |
| 221 | Left rear structural interface member |
| 222 | Right rear structural interface member |
| 231 | Left front rail |
| 232 | Right front rail |
| 240 | Front engine support structure |
| 260 | Front wheel suspension area |
| 300 | Rear body module |
| 310 | Front structural interface |
| 320 | Rear structural interface |
| 350 | Tubular frame |
| 360 | Rear wheel suspension area |
| 400 | Front-end body module |
| 420 | Rear structural interface |
| 430 | Bumper beam |
| 431 | Left crash box |
| 432 | Right crash box |
| 500 | Rear-end body module |
| 510 | Front structural interface |
| 530 | Bumper beam |
| 531 | Left crash box |
| 532 | Right crash box |
| 600 | Front extension body module |
| 610 | Front structural interface |
| 611 | Left front structural interface member |
| 612 | Right front structural interface member |
| 620 | Rear structural interface |
| 631 | Left front extension rail |
| 632 | Right front extension rail |
| 621 | Left rear structural interface member |
| 622 | Right rear structural interface member |
| 532 | Right crash box |
| 700 | Passenger extension body module |
| 710 | Front structural interface |
| 720 | Rear structural interface |
| 800 | Auxiliary stiffening structure |
| 901 | Anchorage point |
| X | Longitudinal direction |
| Y | Lateral direction |
| Z | Vertical direction |

The invention claimed is:

1. A vehicle body platform (1) for an automobile, comprising:
   a. a passenger body module (100) comprising a front structural interface (110) and a rear structural interface (120);
   b. a front body module (200) comprising a rear structural interface (220);
   c. a rear body module (300) comprising a front structural interface (310);
   d. a passenger extension body module (700) configured to be arranged between the passenger body module (100) and the rear body module (300), the passenger extension body module (700) comprising a front structural interface (710) configured to be mechanically interconnected with the rear structural interface (120) of the passenger body module (100) and a rear structural interface (720) configured to be mechanically interconnected with the front structural interface (310) of the rear body module (300);

e. whereby
   i. the rear structural interface (220) of the front body module (200) and the front structural interface (110) of the passenger body module (100) are corresponding structural interfaces configured to mechanically interconnect the passenger body module (100) with the front body module (200)
   ii. the front structural interface (310) of the rear body module (300) and the rear structural interface (120) of the passenger body module (100) are corresponding structural interfaces configured to mechanically interconnect the passenger body module (100) with the rear body module (300)
   iii. the rear structural interface (120) of the passenger body module (100) and the rear structural interface (720) of the passenger extension body module (700) are identical types of interfaces configured to be mechanically interconnected with the same mechanical connecting points (10) of the front structural interface (310) of the rear body module (300) and
   iv. the rear body module (300) comprises a truss.

2. A vehicle body platform (1) for an automobile, comprising:
   a. a passenger body module (100) comprising a front structural interface (110) and a rear structural interface (120);
   b. a front body module (200) comprising a rear structural interface (220);
   c. a rear body module (300) comprising a front structural interface (310);
   d. a passenger extension body module (700) configured to be arranged between the passenger body module (100) and the rear body module (300), the passenger extension body module (700) comprising a front structural interface (710) configured to be mechanically interconnected with the rear structural interface (120) of the passenger body module (100) and a rear structural interface (720) configured to be mechanically interconnected with the front structural interface (310) of the rear body module (300);
   e. whereby
      i. the rear structural interface (220) of the front body module (200) and the front structural interface (110) of the passenger body module (100) are corresponding structural interfaces configured to mechanically interconnect the passenger body module (100) with the front body module (200)
      ii. the front structural interface (310) of the rear body module (300) and the rear structural interface (120) of the passenger body module (100) are corresponding structural interfaces configured to mechanically interconnect the passenger body module (100) with the rear body module (300)
      iii. the rear structural interface (120) of the passenger body module (100) and the rear structural interface (720) of the passenger extension body module (700) are identical types of interfaces configured to be mechanically interconnected with the same mechanical connecting points (10) of the front structural interface (310) of the rear body module (300) and
      iv. the vehicle body platform (1) comprises a front extension body module (600) configured to be arranged between the passenger body module (100) and the front body module (200).

3. The vehicle body platform (1) according to claim 2, wherein the front extension body module (600) comprises a front structural interface (610) configured to be mechanically interconnected with the rear structural interface (220) of the front body module (200) and a rear structural interface (620) configured to be mechanically interconnected with the front structural interface (110) of the passenger body module (100).

4. The vehicle body platform (1) according to claim 3, wherein the rear structural interface (220) of the front body module (200) and the rear structural interface (620) of the front extension body module (600) are identical types of interfaces configured to be mechanically interconnected with same mechanical connecting points (10) of the front structural interface (110) of the passenger body module (100).

5. The vehicle body platform (1) according to claim 3, wherein the rear structural interface (220) of the front body module (200) and the rear structural interface (620) of the front extension body module (600) are different types of interfaces configured to be mechanically interconnected with different mechanical connecting points (10) of the front structural interface (110) of the passenger body module (100).

6. The vehicle body platform (1) according to claim 1, wherein the vehicle body platform (1) comprises a front-end body module (400) having a rear structural interface (420) configured to be mechanically interconnected with a front structural interface (210) of the front body module (200).

7. The vehicle body platform (1) according to claim 1, wherein the vehicle body platform (1) comprises a rear-end body module (500) comprising a front structural interface (510) configured to be mechanically interconnected with a rear structural interface (320) of the rear body module (300).

8. The vehicle body platform (1) according to claim 1, wherein the vehicle body platform (1) comprises an auxiliary stiffening structure (800) mechanically interconnecting the front body module (200) with the passenger body module (100).

9. The vehicle body platform (1) according to claim 8, wherein the auxiliary stiffening structure (800) is arranged at a side of the vehicle body platform that during operation of the vehicle is directed away from the roadway.

10. The vehicle body platform (1) according to claim 1, wherein at least one of the front and/or rear structural interfaces (110, 120, 210, 220, 310) comprises at least one flange (51) having at least one contact face (52) configured for load transfer to an adjacent body module (100, 200, 300).

11. The vehicle body platform (1) according to claim 10, wherein the flange (51) is arranged at an angle bracket (50).

12. The vehicle body platform (1) according to claim 10, wherein the flange (51) is at least partially composed of at least two angle brackets (50) having complementary contact faces (52) together forming a composed contact face of a composed fixing plate (55).

13. The vehicle body platform (1) according to claim 1, wherein the rear structural interface (220) of the front body module (200) comprises a left rear structural interface member (221) and a right rear structural interface member (222) and the front body module (200) comprises a left front rail (231) extending from the left rear structural interface member (221) essentially in the longitudinal direction (x) of the front body module (200) and a right front rail (232)

extending from the right rear structural interface member (222) essentially in the longitudinal direction (x) of the front body module (200).

14. The vehicle body platform (1) according to claim 3, wherein the rear structural interface (620) of the front extension body module (600) comprises a left rear structural interface member (621) and a right rear structural interface member (622) and the front extension body module (600) comprises a left front extension rail (631) extending from the left rear structural interface member (621) essentially in the longitudinal direction (x) of the front extension body module (600) and a right front extension rail (632) extending from the right rear structural interface member (622) essentially in the longitudinal direction (x) of the front extension body module (600).

15. The vehicle body platform (1) according to claim 14, wherein the front structural interface (610) of the front extension body module (600) comprises a left front structural interface member (611) and a right front structural interface member (612), the left front structural interface member (611) and the left rear structural interface member (621) of the front extension module (600) and the left front extension rail (631) being essentially arranged on a straight line in the longitudinal direction (x) of the front extension body module (600) and the right front structural interface member (612) and the right rear structural interface member (622) of the front extension module (600) and the right front extension rail (632) being essentially arranged on a straight line in the longitudinal direction (x) of the front extension body module (600).

16. The vehicle body platform (1) according to claim 2, wherein when the passenger body module (100) and the front extension body module (600) and the front body module (200) are in a mechanically interconnected state, the front structural interface (110) of the passenger body module (100) and the front structural interface (610) of the front extension body module (600) and the front structural interface (210) of the front body module (200) are essentially arranged on a straight line in the longitudinal direction (x) of the passenger body module (100).

17. A vehicle body platform (1) for an automobile, comprising:
   a. a passenger body module (100) comprising a front structural interface (110) and a rear structural interface (120);
   b. a front body module (200) comprising a rear structural interface (220);
   c. a rear body module (300) comprising a front structural interface (310);
   d. a passenger extension body module (700) configured to be arranged between the passenger body module (100) and the rear body module (300), the passenger extension body module (700) comprising a front structural interface (710) configured to be mechanically interconnected with the rear structural interface (120) of the passenger body module (100) and a rear structural interface (720) configured to be mechanically interconnected with the front structural interface (310) of the rear body module (300);
   e. whereby
      i. the rear structural interface (220) of the front body module (200) and the front structural interface (110) of the passenger body module (100) are corresponding structural interfaces configured to mechanically interconnect the passenger body module (100) with the front body module (200)
      ii. the front structural interface (310) of the rear body module (300) and the rear structural interface (120) of the passenger body module (100) are corresponding structural interfaces configured to mechanically interconnect the passenger body module (100) with the rear body module (300)
      iii. the rear structural interface (120) of the passenger body module (100) and the rear structural interface (720) of the passenger extension body module (700) are identical types of interfaces configured to be mechanically interconnected with the same mechanical connecting points (10) of the front structural interface (310) of the rear body module (300) and
      iv. the mechanical interconnections between the structural interfaces (110, 120, 210, 220, 310) are embodied as detachable mechanical interconnections.

18. The vehicle body platform (1) according to claim 17, wherein the detachable mechanical interconnections are established by fasteners (56).

19. The vehicle body platform (1) according to claim 18, wherein the fasteners comprise at least one screw and/or threaded bolt and/or rivet.

20. A vehicle body platform (1) for an automobile, comprising:
   a. a passenger body module (100) comprising a front structural interface (110) and a rear structural interface (120);
   b. a front body module (200) comprising a rear structural interface (220);
   c. a rear body module (300) comprising a front structural interface (310);
   d. a passenger extension body module (700) configured to be arranged between the passenger body module (100) and the rear body module (300), the passenger extension body module (700) comprising a front structural interface (710) configured to be mechanically interconnected with the rear structural interface (120) of the passenger body module (100) and a rear structural interface (720) configured to be mechanically interconnected with the front structural interface (310) of the rear body module (300);
   e. whereby
      i. the rear structural interface (220) of the front body module (200) and the front structural interface (110) of the passenger body module (100) are corresponding structural interfaces configured to mechanically interconnect the passenger body module (100) with the front body module (200)
      ii. the front structural interface (310) of the rear body module (300) and the rear structural interface (120) of the passenger body module (100) are corresponding structural interfaces configured to mechanically interconnect the passenger body module (100) with the rear body module (300)
      iii. the rear structural interface (120) of the passenger body module (100) and the rear structural interface (720) of the passenger extension body module (700) are identical types of interfaces configured to be mechanically interconnected with the same mechanical connecting points (10) of the front structural interface (310) of the rear body module (300) and
      iv. the passenger body module (100) comprises a floorpan (130) made from a sheet material.

21. The vehicle body platform (1) according to claim 20, wherein the passenger body module (100) comprises an upper framework (140) arranged on and mechanically interconnected with the floorpan (130).

22. The vehicle body platform (1) according to claim 1, wherein the passenger body module (100) comprises at least one tunnel (150) extending along the passenger body module (100) in longitudinal direction (x) of the passenger body module (100).

23. The vehicle body platform (1) according to claim 1, wherein an internal combustion engine is arranged in the rear body module (300).

24. The vehicle body platform (1) according to claim 1, wherein an electric motor is arranged in the rear body module (300).

25. The vehicle body platform (1) according to claim 1, wherein at least part of an electric powertrain is arranged in the front body module (200).

26. The vehicle body platform (1) according to claim 1, wherein the vehicle body platform (1) comprises a front extension body module (600) configured to be arranged between the passenger body module (100) and the front body module (200).

27. The vehicle body platform (1) according to claim 26, wherein the front extension body module (600) comprises a front structural interface (610) configured to be mechanically interconnected with the rear structural interface (220) of the front body module (200) and a rear structural interface (620) configured to be mechanically interconnected with the front structural interface (110) of the passenger body module (100).

28. The vehicle body platform (1) according to claim 27, wherein the rear structural interface (220) of the front body module (200) and the rear structural interface (620) of the front extension body module (600) are identical types of interfaces configured to be mechanically interconnected with same mechanical connecting points (10) of the front structural interface (110) of the passenger body module (100).

29. The vehicle body platform (1) according to claim 27, wherein the rear structural interface (220) of the front body module (200) and the rear structural interface (620) of the front extension body module (600) are different types of interfaces configured to be mechanically interconnected with different mechanical connecting points (10) of the front structural interface (110) of the passenger body module (100).

30. The vehicle body platform (1) according to claim 26, wherein when the passenger body module (100) and the front extension body module (600) and the front body module (200) are in a mechanically interconnected state, the front structural interface (110) of the passenger body module (100) and the front structural interface (610) of the front extension body module (600) and the front structural interface (210) of the front body module (200) are essentially arranged on a straight line in the longitudinal direction (x) of the passenger body module (100).

* * * * *